United States Patent [19]

Kovacs

[11] 4,160,723
[45] Jul. 10, 1979

[54] METHOD AND APPARATUS FOR REMOVAL OF POLLUTANTS FROM WASTE WATER

[76] Inventor: Andrew J. Kovacs, 157 Lardintown Rd., Sarver, Pa. 16055

[21] Appl. No.: 685,005

[22] Filed: May 10, 1976

[51] Int. Cl.² ............................ C02C 1/08; C02C 1/12
[52] U.S. Cl. ............................................ 210/7; 210/14; 210/15; 210/199; 210/259; 261/122; 261/124; 210/195.2; 210/195.3
[58] Field of Search ............. 210/3, 4, 14, 15, 50, 210/7, 194 R, 195 S, 197, 199, 252, 18, 255, 195, 220, 221 R, 532 C, 73 S, 83, 532 R, 538, 259; 261/122, 124

[56] References Cited
U.S. PATENT DOCUMENTS

| | | | |
|---|---|---|---|
| 3,207,314 | 9/1965 | Pearson | 210/195 S |
| 3,232,866 | 2/1966 | Morgan | 210/15 |
| 3,336,016 | 8/1967 | Schreiber | 210/14 X |
| 3,396,102 | 8/1968 | Forrest | 210/195 M X |
| 3,525,436 | 8/1970 | Reckers | 210/220 |
| 3,525,685 | 8/1970 | Edwards | 261/124 X |
| 3,537,583 | 11/1970 | Plochingen et al. | 210/4 X |
| 3,591,492 | 7/1971 | Neuspiel | 210/15 X |
| 3,694,353 | 9/1972 | Yang et al. | 210/197 X |
| 3,744,637 | 7/1973 | Ziegler | 210/525 X |
| 3,764,523 | 10/1973 | Stankewich, Jr. | 210/15 X |
| 3,859,215 | 1/1975 | Milne | 210/195 S X |
| 3,907,672 | 9/1975 | Milne | 210/195 S X |
| 4,021,347 | 5/1977 | Teller et al. | 210/195 S |

Primary Examiner—Arnold Turk
Attorney, Agent, or Firm—Steele, Gould & Fried

[57] ABSTRACT

Apparatus is provided for removing pollutants from waste water. An activated sludge system is disclosed comprising generally a two tank system in which uniquely designed and positioned air diffusion and liquor transfer systems are utilized in combination with improved tank designs to effectively carry waste water through aeration and clarification stages to provide a fluid of a purification level not heretofore attainable from small activated sludge systems.

13 Claims, 6 Drawing Figures

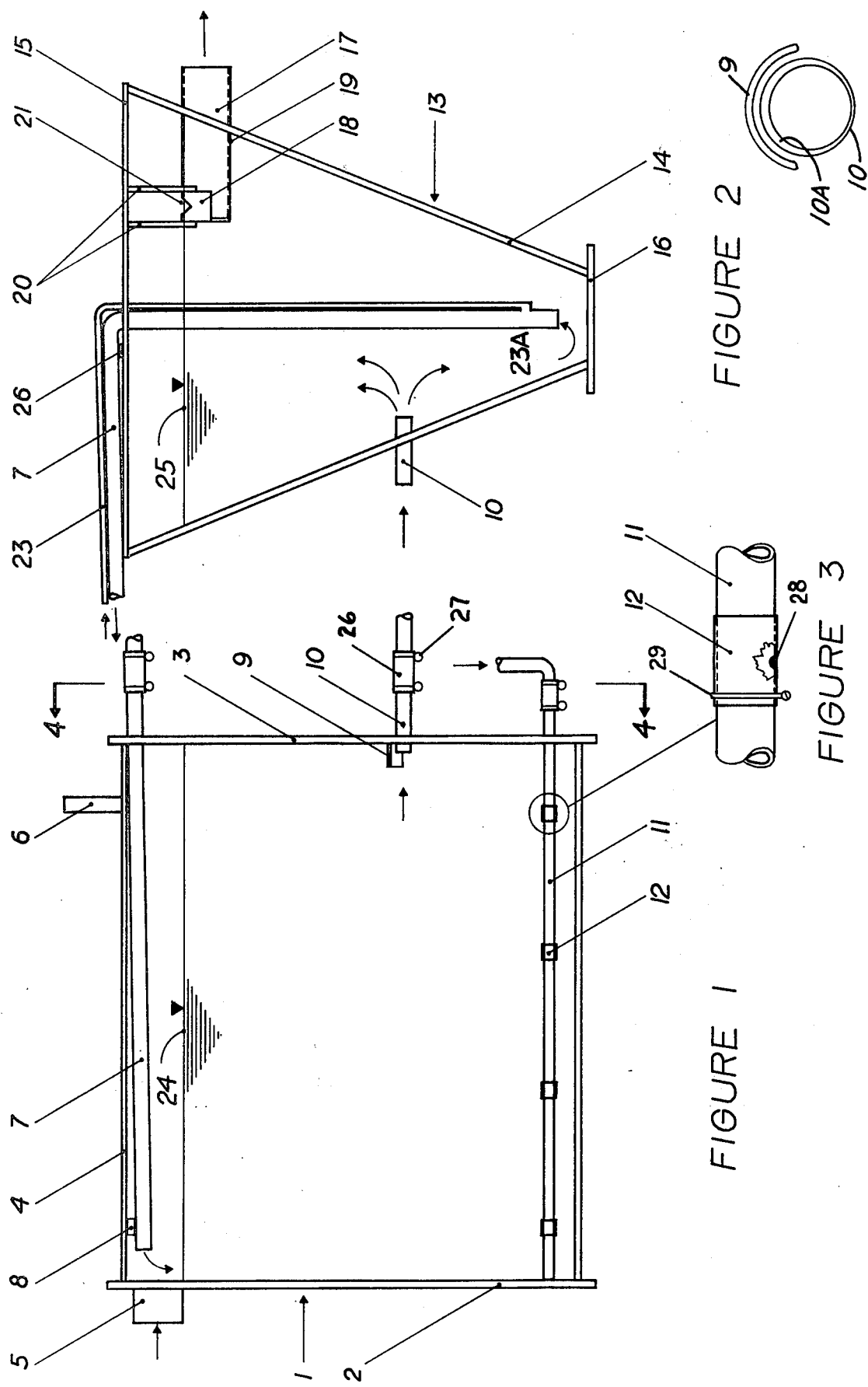

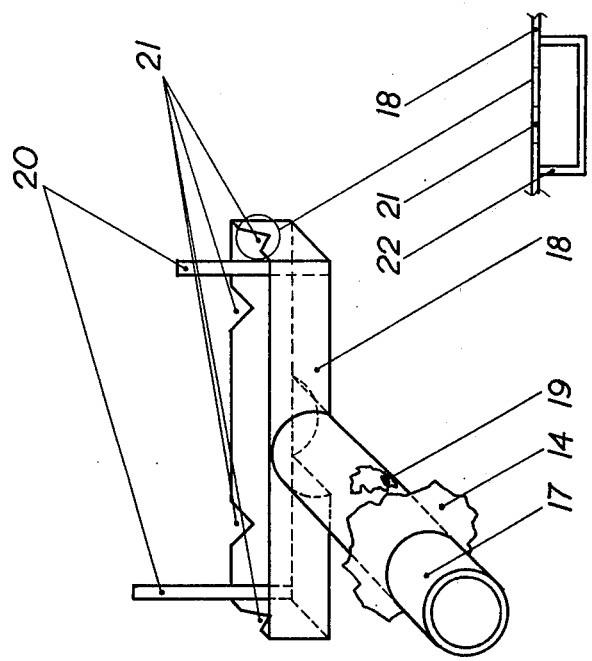
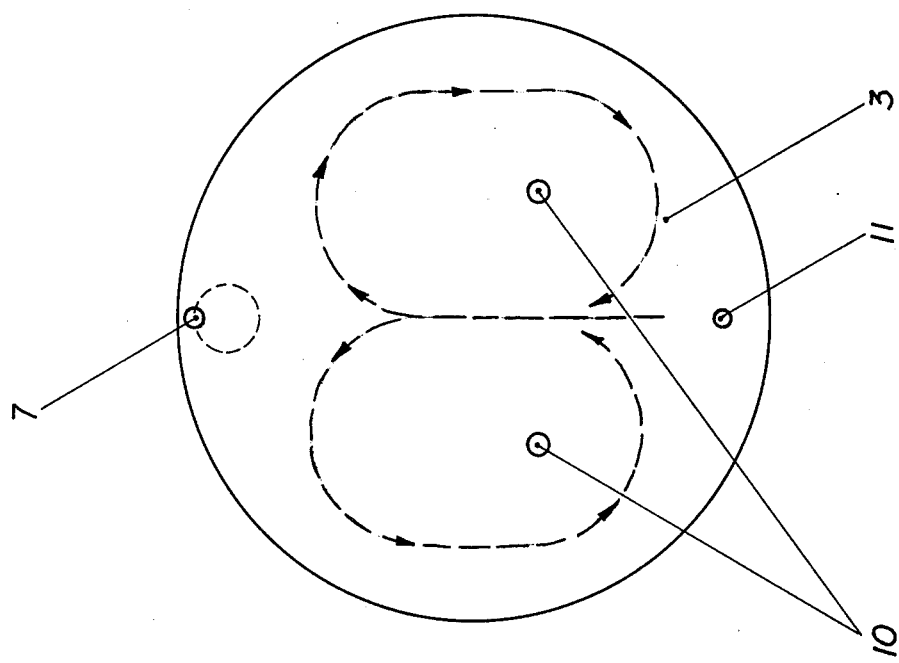

METHOD AND APPARATUS FOR REMOVAL OF POLLUTANTS FROM WASTE WATER

BACKGROUND OF THE INVENTION

1. Field of the Invention

This invention relates to pollution removal from sewage by means of a meticulously designed system which enables the system to be contained in compact relatively inexpensive apparatus which is ideally suited for single family dwellings and other units where complex systems are neither desirable nor affordable. While the disclosed system has features and elements which can be utilized in modified arrangements including plants designed to serve larger population segments, it will be appreciated that the elements which make up the subject invention combine to provide a vastly superior means to aerate, flocculate, separate and clarify waste pollutants from their water transport media in a self-contained highly efficient system or plant so much in demand today in rural areas.

The system utilizes aerobic micro-organisms to convert unstable pollutants into stable, non-putrescible compounds. Untreated waste water is combined in an aeration tank with a well aerated activated sludge which is super-abundant with aerobic micro-organisms. The micro-organisms adsorb and absorb suspended and dissolved pollutants from the untreated waste water as they are further stimulated by the addition of dissolved oxygen to reduce the pollutants to stable compounds. The mixed liquor, of micro-organisms and stable compounds is then conveyed into a clarifier tank. In the clarifier, the solids, aerobic micro-organisms and stable compounds, are induced to separate from the water transport media and settle to the bottom of the clarifier. The solids are then returned to the incoming end of the aeration tank as super-abundant micro-organisms.

2. Prior Art

Various types of activated sludge systems are known and have been in use for many years. One widely used such system comprised generally a primary settler, an aerator and a final settler with return sludge being channeled from the final settler to the primary settler and/or the aerator. A variation of such a system was disclosed in U.S. Pat. No. 2,065,123 which issued to J. R. Downs on Dec. 22, 1936.

In more recent systems, two tank processes have been utilized in which an aerator and a clarifier are utilized in combination to treat refuse streams. Systems of this type can be found in U.S. Pat. No. 2,363,176 which issued on Nov. 21, 1944 to J. Gunz and in *WATER AND WASTE—WATER TECHNOLOGY* by Hammer (John Wiley and Sons, 1975) on page 391.

The common drawback in the use of activated sludge processes in the past has been the inability of designers of such systems to achieve the optimum control of the waste water at all stages during the decomposition period which is of vital necessity if one is to achieve goals necessary to make such a system acceptable by environmental protection standards. More specifically, the waste water treatment must be free of anaerobic deterioration throughout the process. Such action occurs during settling and storage periods when anaerobic micro-organisms thrive without oxygen supply, thus creating anaerobic conditions which are directly opposed to aerobic decomposition or biological action. This anaerobic decomposition or deterioration of the sludge can occur quite quickly such as when sewage is momentarily constrained in depressions and cavities of systems and apparatus, and once anaerobic decomposition occurs, considerably greater quantities of energy, necessitating considerable expense for equipment and power, have to be expanded to reverse the anaerobically sour sludge if a high degree of clarification is to be achieved.

As stated, although the principles of pollution abatement through the use of aerobic micro-organisms are well known, there is not an economical and reliable system available for use in residential or small commercial unit service. Fluid flow considerations have not been developed to the optimum and the existing systems do not effectively mix the raw feed stream together with the sludge material and oxygen to sufficiently treat the wastes nor do they provide apparatus which constrains ingredients in such a manner to provide sufficient time for the actions and separations to occur at the optimum points within the system.

SUMMARY OF THE INVENTION

Accordingly, it is an object of the subject invention to provide an activated sludge process in which a high degree of waste water treatment is achieved through design efficiency in which system elements are combined to produce a waste stream path precisely controlled through its evolution.

It is a related object of the subject invention to provide an activated sludge process adaptable for residential and small commercial usage which will produce an effluent acceptable for environmental standards.

It is another object of the subject invention in producing an improved activated sludge process to provide an air diffuser system of optimum design and positioned integrally within the overall system to provide maximum efficiency for the aeration process.

It is yet another object of the subject invention to provide the improved activated sludge process with a return sludge system uniquely designed and positioned so that optimum flow conditions are met in the pickup and expulsion of the active sludge.

It is still one other object of the subject invention to provide an activated sludge system in which aerator and clarification tanks are designed so as to create optimum flow conditions of the waste water stream within said tanks and wherein liquor transfer means between said tanks are utilized to maintain the optimum flow techniques.

It is still one more object of the subject invention to provide an efficient effluent discharge system which serves as an integral part of the overall activated sludge process to ensure that overall flow level considerations are met.

In accordance with the above objects, an improved sewage treatment system has been invented that will thoroughly mix and aerate a waste water stream and permit a clean effluent to be separated therefrom. An aeration tank is provided which preferably is cylindrical with its center line axis horizontally disposed. Air dispersing means of improved design is uniquely positioned within the aeration tank to introduce oxygen bubbles at spaced intervals for the dual purpose of providing aeration throughout and for creating flow paths to achieve optimum aerobic decomposition.

A clarification tank is provided preferably of an inverted conical nature and having air lift means for recycling aerobically activated sludge back to the aeration tank. A liquor transfer system is provided for carrying the mixed liquor from the aeration tank to the clarification tank and dispensing the liquor within the clarification tank to enable by sedimentation a separation of effluent from sludge. By airlift means, a settling sludge is aspirated through return sludge means to a point of discharge in the aeration tank in the proximity of where the raw waste stream was introduced.

BRIEF DESCRIPTION OF THE DRAWINGS

Further objects and advantages of the invention will become apparent from the following description taken in conjunction with the accompanying drawings in which:

FIG. 1 is a side sectional view showing the system which includes the aeration and clarification tanks together with the air diffusion, return sludge, aerobic comminution, liquor transfer, induced sedimentation, and influent and effluent systems;

FIG. 2 is an enlarged side view of the entry portion of the liquor transfer means;

FIG. 3 is an enlarged view of an oxygen-dispersing point of FIG. 1;

FIG. 4 is an end view of the aeration tank of FIG. 1 as shown along line 4—4;

FIG. 5 is an isometric view of the effluent system of the clarification tank of FIG. 1; and FIG. 6 is a detailed view of the effluent discharge means shown in FIG. 5.

DETAILED DESCRIPTION OF THE PREFERRED EMBODIMENTS

With reference to FIG. 1, aeration tank 1 is shown to be a cylinder horizontally disposed having end walls 2 and 3 and curved side wall 4. An influent pipe 5 is shown in side wall 2 in which the raw sewage and waste water streams flow into aeration tank 1. A vent pipe 6 is shown secured to an opening through side wall 4. A return sludge pipe 7 is shown extending into aeration tank 1 and being secured at its terminus by bracket means 8 near the entry flow path of incoming waste material through influent pipe 5. On the inside of end wall 3, eyelid-type shields 9 are shown mounted as partial protective covers for liquor transfer pipes 10 which carry mixed liquor to the clarification process (see FIG. 2). With further reference to FIG. 2, a piece of sheet metal 10A or other material may be mounted at the mouth of pipe 10 in aeration tank 1 to restrict the cross sectional entry area into the pipe to further prevent the introduction of elements which could serve to clog pipe 10. For example, a one and a half inch diameter piece may be used with the entry area restricted to one and a quarter inches by the piece of sheet metal.

Compressed air pipe header 11 extends longitudinally within the base of aeration tank 1 and as can be seen in FIG. 1, elastic aperture sleeves 12 are positioned along pipe header 11. These elastic aperture sleeves 12 protect holes positioned along the lower half of pipe header 11 as will be described in detail.

With further reference to FIG. 1, clarification tank 13 of generally inverted conical configuration is shown positioned adjacent the aeration tank 1. Transfer pipe 10 is shown extending from aeration tank 1 into clarification tank 13 and in addition, return sludge line 7 is also shown interconnecting the two tanks, 1 and 13. Tank 13 is preferably vertically disposed and is formed by inclined side wall 14 which joins top cover 15 and space member 16. Effluent tube 17 extends outwardly from clarification tank 13 and is shown connected with effluent trough 18 which is best seen in FIG. 5. The effluent pipe 17 is shown having an orifice 19 at a point along the base of its circumference. Braces 20 are shown supporting the effluent trough or weir 18 which is also shown as having V-shape notches 21 around a portion of its perimeter. Although not shown in FIG. 1, a scum baffle 22 as shown in the top view of FIG. 6 may be disposed at each V-notch location.

A supply line 23 is shown running adjacent a return sludge line 7 which delivers air from a compressor means, not shown, to within the clarification tank 13 where the air is fed into return sludge line 7 through orifice 23A. The level of tanks 1 and 13 is shown designated by reference numerals 24 and 25 respectively. Hose fittings 26 shown clamped by hose clamps 27 are shown used on a number of pipes within the system and of course have no significance with respect to the subject invention.

With respect to FIG. 3, the elastic aperture sleeve 12 is shown covering a typical orifice or aperture 28 and the elastic sleeve 12 is shown clamped in place by clamp member 29. A friction fit or adhesive may also be used to secure the sleeve 12 in place. In the preferred embodiment, it is to be understood that the air does not permeate through the sleeve 12 but rather follows a path between the sleeve 12 and the outside wall of pipe 11 until the end of sleeve 12 is reached. The sleeve 12 may be neoprene or Buna N rubber.

Having briefly described elements of the subject apparatus, the invention will now be described in detail in such manner that significant aspects of the various elements can be appreciated. As mentioned previously, when treating sewage by aerobic decomposition with the use of aerobic micro-organisms, it is of utmost importance to provide ideal environment by providing sufficient dissolved oxygen together with adequate organic matter in a continual and perpetual manner. Thus, waste water enters the aeration tank through influent pipe 5 and it will be noted that return sludge line 7 extends into aeration tank 1 to the proximity of the entry point of influent pipe 5. It will be noted that air header 11 extends longitudinally along the base of the tank and near its leftward extremity, the first of the oxygen dispersing points can be seen as represented by the elastic aperture sleeves 12. Dissolved oxygen bubbles up from the oxygen dispersing points and thus it will be appreciated that immediately upon entry to the aeration tank 1, the raw waste water supply is acted on by the returning activated sludge in the presence of an oxygen supply. More specifically, the return sludge, super-abundant in micro-organisms, combines with the waste water containing organic matter which serves as food for the organisms and with the dissolved oxygen which effectively fuels the feeding process. The ideal environment for the micro-organisms has been created and stabilization of the pollutants has been initiated. The flow pattern of the waste water through the aeration tank is from left to right as the waste water makes its way to transfer pipes 10 which will channel it to the clarification tank 13. As additional waste water enters through inlet 5, the excess liquor is displaced through the liquor transfer pipes 10 to clarification tank 13.

At least four oxygen dispersing points are shown along air header pipe 11 and since these are spaced throughout the length of header 11, a continual oxygen supply will be received as the waste water progresses rightwardly across aeration tank 1. With reference to FIG. 4, it will be seen that air header 11 is placed near or at the center of an imaginery vertical diameter line through the aeration tank 1. Thus, as oxygen is released along air header 11, it will bubble upwardly at intervals along this imaginery vertical center line, thus creating two opposite directional rolls which thoroughly disperse the dissolved oxygen and intermix the incoming waste water with the liquor of tank 1 and the return sludge from the return sludge line 7. These rolls can be seen by the dotted arrow lines in FIG. 4 and the significance of having a cylindrical tank can now be appreciated. Continual circulation is achieved as the ingredients flow down the curved side walls and then are raised upwardly in the center to continue the process while being constantly mixed with the other ingredients within the tank 1.

While the positioning of air header 11 is of significant importance, of additional importance is the design of the header and precisely the diffusers which must create effective bubble dispersion. Preferably, holes 28 (see FIG. 3) having diameters from about one thirty-second to as large as one inch diameter on the lower half of pipe header 11 are utilized. A series of such holes or apertures 28 may be utilized at each of the dispersion points. The apertures 28 are covered and protected with elastic aperture sleeves 12 which are preferably neoprene sleeves. The pipe header itself can be fabricated from known metals or alloys, plastics or rubbers. The elastic aperture sleeve or neoprene sleeve 12 may be attached to header 11 by clamp 29 as shown although other means such as adhesives, screws, rivets or the like would be satisfactory. In the case where a tight friction fit is achieved between sleeve 12 and header 11, clamps or attaching means may not be necessary.

The principal function of the sleeve is to keep solids from going into the opening or apertures 28 when the air compressor is shut down. This is a primary cause of diffuser failure in other diffuser designs since when the pressure inside the line is shut off, water will rush into the pipe carrying solids, stringy material, and sludge with it. Such matter will quickly plug air openings with the unavoidable effect of lessening the air supply and slowing the activities of micro-organisms within the system.

Additionally, the diffusing system is designed to disperse the bubbles at a number of points along the length of header 11. By dispersing bubbles in this manner, a better contact surface is provided and more transfer service between the waste water and the air bubble itself occurs, thus better fuelling the micro-organism activity. Additionally, where the sleeves 12 are friction fitting or adhesively secured (along the top of pipe 11) the air bubbles will tend to travel along the outside bottom of pipe 11 in both directions from aperture 28 until they clear the ends of sleeve 12 and rise within aeration tank 1. Thus there are more bubble discharge points and it should also be recognized the bubbles of different sizes are produced by this system which is an additional advantage. While as mentioned it is preferable to locate header 11 in the center of tank 1, it is also preferable to position the header near the lowest part of the tank, preferably within 18 inches from the bottom. The compressed air from the header 11 is allowed to continuously escape from the tank to the atmosphere through vent 6.

With reference to FIG. 4, it will be seen that two liquor transfer pipes 10 are utilized and as shown in FIG. 1, extend from aeration tank 1 to the clarification tank 13. The positioning of these pipes 10 is of importance and it will be noted that they are positioned to accommodate and accentuate the continuous roll-around flow paths of the advancing liquor in tank 1. The transfer pipes 10 are preferably located from the center ¼ radius to ¾ radius and vertically from the top of the tank ¼ diameter to ¾ diameter downward. This location prevents heavy solids which have not sufficiently decomposed from passing out of tank 1 until they are reduced in size and mass by aerobic decomposition. Additionally, as best seen in FIG. 2, an eyelid 9 is provided to prevent large solids such as rags, paper and the like from clogging the transfer pipe between aeration tank 1 and clarification tank 2. Thus, the large solids remain in tank 1 and liquor containing small solids and slimes passes into tank 13. As the liquor flows into clarification tank 13, there is essentially no vertical movement through this system although levels 24 and 25 will tend to rise upwardly.

Tank 13 is preferably vertically disposed and of increasing cross-section upwardly. The small solids and slimes thus settle from the liquid which moves upwardly at decreasing rates because of the increasing cross-sectional area for flow. It is important that the liquor comes into tank 13 at a relatively low point through liquor transfer tubes 10 so that the incoming liquor does not interfere with the clear liquid zone above.

Sludge reaching the base of the clarification tank 13 is aspirated into sludge return pipe 7 near the base 16 of tank 13 by compressed air from supply pipe 23 which can be considered part of a conventional air lift device. The connection 23A from air supply pipe 23 to return sludge pipe 7 should be an air tight connection and as the air is introduced into pipe 7, the density of the liquid column is lowered with the frictional drag of the bubbles carrying liquid upwardly with it. Thus, while the purpose of the oxygen that is being introduced near the base of sludge line 7 is to air lift the sludge, additionally, it fuels the sludge as a good transfer of dissolved oxygen occurs and by the time the sludge with its micro-organisms is reintroduced into tank 1, it is in a well activated condition.

When there is no incoming waste water flow through influent pipe 5, the contents are continuously treated and the volume of liquor recycled back to tank 1 is approximately the volume of liquor which will flow from tank 1 into tank 13 since both tanks are at atmospheric pressure. When there is waste water feed into tank 1, level 25 of tank 13 will rise and clear, treated effluent will flow out of tank 13 over the V-notches 21 in trough 18 leaving the system through effluent pipe 17. The scum baffles 22 which surround notches 21 will retain any light floatable particles within tank 13.

The rise rate of this system is important and it is desirable to have as much quiescence in the system as possible so that light particles which do not need much stimulation to begin movement are retained in an immobile state. To assist in achieving such quiescence throughout the system, aperture or opening 19 has been drilled in the bottom of effluent flow pipe 17 to permit effluent to constantly flow at a very slow rate out of tank 13 until the liquid level works itself down below the base of effluent pipe 17. Thus, a considerable quantity of effluent may be conveniently discharged while maintaining the contents of tank 13 in a quiescent state during, for example, a course of a night when sewage input into the system is at a low level. Thus, periods of relative inactivity are taken advantage of to expel a quantity of effluent in preparation for subsequent peak period activity.

With further reference to the clarifier tank 13, the transfer pipes 10 enter tank 13 either horizontally or pitched slightly downwardly. The pipes 10 enter the tank at an elevation from ten inches to three-fourths of the liquor depth above the bottom of the tank. Additionally, the pipes 10 preferably are from one-tenth to four-tenths the horizontal dimension of the tank at the point of entry, in from the outer extremities of tank 13 to each of the inlet pipes 10.

Further, with respect to the clarifier tank 13, in the preferred embodiment, the return sludge line 7 is centered in tank 13 and extends to within four inches of the tank bottom 16. The air supply is integrated with the vertical return sludge line 7 and discharges into return sludge line 7 between one inch and twelve inches above the entrance end of the sludge line. The horizontally oriented portion of the return sludge line 7 joins the vertical portion with a smooth curved one-quarter bend and is sloped downwardly to the discharge point within aeration tank 1 at a slope between one-thirty-second inch per foot and two inches per foot.

While various embodiments of the invention have been shown and described, it will be understood that other modifications may be made. The appended claims, therefore, are intended to define the true scope of the invention.

I claim:

1. Apparatus for removing pollutants from waste water, comprising:
   an aeration tank including means of entry into which waste water is fed, said tank being horizontally disposed and having curved side walls;
   an oxygen diffusing system within said aeration tank including means for diffusing oxygen at spaced intervals substantially along said tank, said diffused oxygen causing sludge in said tank to circulate in at least one rolling path;
   a clarifier tank to be used in combination with said aeration tank for the purpose of separating said sludge from clarified liquid;
   transfer means for transferring contents from said aeration tank to said clarifier tank;
   means to return said sludge from said clarifier tank to said aeration tank, said return means being designed and positioned to direct said sludge to the proximity of incoming waste water, with said oxygen diffusing system being positioned to provide oxygen to the proximity of said incoming sludge and said incoming waste water and to further provide oxygen, at said spaced intervals throughout said aeration tank, whereby conducive conditions are provided for aerobic decomposition of waste matter; and,
   means to expel the clarified liquid from said clarifier tank at more than one level, an upper level providing a faster flow rate than a lower level.

2. The apparatus of claim 1 wherein said clarifier tank is vertically disposed with side walls inclined outwardly from its base.

3. The apparatus of claim 1 wherein said oxygen diffusing system comprises a header pipe centrally disposed near the base of said aeration tank causing said sludge to circulate in at least two oppositely directed rolling flow paths within said aeration tank.

4. The apparatus of claim 1 wherein said aeration tank is cylindrical and said transfer means comprises two pipes, each one being somewhat centrally disposed and extending outwardly from a vertical end wall of said tank.

5. The apparatus of claim 1, wherein the means for diffusing oxygen at spaced intervals comprises a plurality of apertures and a plurality of elastic sleeves for covering said plurality of apertures, the oxygen being permitted to diffuse randomly under at least one end of each of said plurality of elastic sleeves.

6. The apparatus of claim 1 wherein said means for diffusing oxygen at spaced intervals comprises at least one aperture at each interval, said at least one aperture being covered by an elastic aperture sleeve.

7. The apparatus of claim 6 wherein the elastic aperture sleeve is a neoprene sleeve or Buna N rubber sleeve.

8. The apparatus of claim 1 wherein said means to return sludge from said clarifier tank comprises a two part sludge line, said first part extending vertically into said clarifier tank terminating at a point near the base of said clarifier tank, said second part comprising a horizontally disposed portion which extends from above said clarifier tank to within said aeration tank and further includes means for aspirating settled sludge into said vertical line.

9. The apparatus of claim 8 wherein said means of aspirating sludge comprises air supply means fluidly connected to said vertical line near its base.

10. Apparatus for removing pollutants from waste water, comprising:
    an aeration tank including means of entry into which waste water is fed, said tank being horizontally disposed and having curved side walls;
    an oxygen diffusing system within said aeration tank including means, for diffusing oxygen in spaced intervals substantially along said tank, said diffused oxygen causing sludge in said tank to circulate in at least one rolling path;
    a clarifier tank to be used in combination with said aeration tank for the purpose of separating said sludge from clarified liquid;
    transfer means for transferring contents from said aeration tank to said clarifier tank;
    means to return said sludge from said clarifier tank to said aeration tank, said return means being designed and positioned to direct said sludge to the proximity of incoming waste water, with said oxygen diffusing system being positioned to provide oxygen to the proximity of said incoming sludge and said incoming waste water and to further provide oxygen, at said spaced intervals throughout said aeration tank, whereby conducive conditions are provided for aerobic decomposition of waste matter; and,
    means to expel the clarified liquid from said clarifier tank, comprising an effluent pipe extending horizontally outwardly from said clarifier tank near its top, said effluent pipe having at least two means of entry for the liquid from within said clarifier tank, said first means being located near the base of said pipe, permitting said effluent to constantly flow at a slow rate and said second means being located near the top of said pipe.

11. The apparatus of claim 10 wherein said first means of entry in said effluent pipe comprises at least one orifice located near the base of said pipe and said second means comprises a weir having notches disposed around its upper extremities, said weir fluidly communicating with said effluent pipe.

12. The apparatus of claim 11 wherein said notches are protected by scum baffles.

13. A method of removing pollutants from waste water comprising the steps of:
   introducing waste water to be treated into an aeration tank;
   immediately subjecting said waste water to activated sludge being channeled to the aeration tank from another part of the system;
   immediately subjecting said waste water to an oxygen supply and continuing to subject said waste water to such an oxygen supply as released from a plurality of dispersion points substantially along said tank while said waste water is in said aeration tank;
   creating flow patterns in said aeration tank whereby tank contents are continuously being circulated by discharging oxygen from said plurality of dispersion points to create roll-around action of said contents;
   transferring resulting liquor from said aeration tank to a clarifier tank;
   aspirating settled sludge from said liquor in said clarifier tank into a return sludge means and transferring it back to said aeration tank; and,
   passing resulting effluent from said clarifier tank by immediately discharging effluent when it reaches a first predetermined level in said clarifier tank, and by slowly discharging effluent continuously when said tank contents are below said first level and above a second predetermined level.

* * * * *